United States Patent
Thibault

(10) Patent No.: US 11,920,815 B2
(45) Date of Patent: Mar. 5, 2024

(54) SMART THERMOSTAT FOR CONTROLLING ADJACENT ROOM TEMPERATURES

(71) Applicant: ECOLINK INTELLIGENT TECHNOLOGY, INC., Carlsbad, CA (US)

(72) Inventor: Thomas Thibault, Carlsbad, CA (US)

(73) Assignee: ECOLINK INTELLIGENT TECHNOLOGY, INC., Carlsbad, CA (US)

(*) Notice: Subject to any disclaimer, the term of this patent is extended or adjusted under 35 U.S.C. 154(b) by 0 days.

(21) Appl. No.: 17/745,341

(22) Filed: May 16, 2022

(65) Prior Publication Data
US 2022/0316740 A1 Oct. 6, 2022

Related U.S. Application Data

(62) Division of application No. 17/221,241, filed on Apr. 2, 2021, now Pat. No. 11,333,385.

(51) Int. Cl.
| | |
|---|---|
| F24F 11/63 | (2018.01) |
| G05B 19/042 | (2006.01) |
| F24F 110/10 | (2018.01) |
| F24F 120/20 | (2018.01) |
| F24F 130/10 | (2018.01) |
| F24F 130/20 | (2018.01) |

(52) U.S. Cl.
CPC ............ *F24F 11/63* (2018.01); *G05B 19/042* (2013.01); *F24F 2110/10* (2018.01); *F24F 2120/20* (2018.01); *F24F 2130/10* (2018.01); *F24F 2130/20* (2018.01); *G05B 2219/2614* (2013.01)

(58) Field of Classification Search
CPC .............................. F24F 11/63; G05B 19/042
See application file for complete search history.

(56) References Cited

U.S. PATENT DOCUMENTS

| | | | |
|---|---|---|---|
| 5,419,489 A * | 5/1995 | Burd | G05D 23/1905 236/47 |
| 2006/0071086 A1 | 4/2006 | Kates | |
| 2007/0043478 A1 | 2/2007 | Ehlers et al. | |
| 2012/0191257 A1 | 7/2012 | Corcoran et al. | |
| 2016/0201933 A1 | 7/2016 | Hester et al. | |
| 2017/0315697 A1 | 11/2017 | Jacobson et al. | |
| 2018/0129232 A1 | 5/2018 | Hriljac et al. | |
| 2020/0370779 A1 | 11/2020 | Matsumoto | |

* cited by examiner

*Primary Examiner* — Mark A Connolly
(74) *Attorney, Agent, or Firm* — Greenberg Traurig, LLP

(57) ABSTRACT

A smart thermostat for controlling the ambient air temperature in a first area when the smart thermostat is located in a second area. One or more desired setpoint temperatures are changed automatically by the smart thermostat based on one or more setpoint modification factors, such as the time of day, current season, location, orientation and present and future weather conditions.

28 Claims, 6 Drawing Sheets

SMART THERMOSTAT FOR CONTROLLING ADJACENT ROOM TEMPERATURES

CROSS-REFERENCE TO RELATED APPLICATIONS

The present application is a divisional of U.S. patent application Ser. No. 17/221,241, filed on Apr. 2, 2021.

BACKGROUND

Field of Use

The present application relates generally to the heating, ventilation and air conditioning arts. More specifically, embodiments of the present invention relate to a smart thermostat for controlling temperatures in rooms adjacent to where the smart thermostat is located.

Description of the Related Art

Thermostats are used to control heating, ventilation, and air conditioning (HVAC) equipment, such as central air conditioners and central heaters, to adjust room temperatures to desired user settings. A vast majority of consumer thermostats contain a single, internal thermal sensor for measuring the ambient air temperature in a location where a thermostat is located. This is ideal for controlling the ambient air temperature in a single room or office. However, in multi-room environments, such as homes and office buildings, these thermostats often do not regulate the ambient air temperature of each room or office well.

For example, in a single story home containing a number of rooms, a single thermostat may be used to control the ambient air temperature in all of the rooms of the home. Typically, the thermostat is located in a central part of the home in order to try and keep the ambient air temperatures in each room the same. However, thermostats in this situation generally fail to maintain the ambient air temperature within each room adequately, in part because external forces may influence the ambient air temperatures quickly, before such influence can be measured by such a centrally-located thermostat. For example, rooms having a southern exposure may heat up quickly once the sun rises on a hot summer day, or when the sun suddenly appears from behind clouds. If the thermostat is located in a hallway or on the northern side of the home, the ambient air temperature near the thermostat may not rise until many minutes, or even hours, after such sudden heating (or cooling) of the southern facing rooms.

It would be desirable, therefore, to be able to better regulate the ambient air temperature of multiple areas using a single thermostat having an internal thermal sensor.

SUMMARY

Embodiments of the present invention are directed towards a method and apparatus for controlling the ambient air temperature of a first area when a smart thermostat controlling the ambient air temperature of the first area is located in a second area. In one embodiment, a smart thermostat is described, comprising a temperature sensor, an HVAC interface, a memory for storing processor-executable instructions, a desired setpoint temperature and a setpoint modification factor, and a processor, coupled to the temperature sensor, the HVAC interface and the memory for executing the processor-executable instructions that causes the processor to receive temperature readings from the temperature sensor of ambient air in the second area, automatically determine a modified setpoint temperature based on the desired setpoint temperature and a setpoint modification factor, and control HVAC equipment communicably coupled to the thermostat via the HVAC interface in accordance with the temperature readings from the temperature sensor and the modified setpoint temperature.

In another embodiment, a method is described, performed by a smart thermostat located in a first area, for controlling ambient air temperature of a second area, comprising, receiving temperature readings from a temperature sensor of the thermostat of ambient air in the first area, automatically determining a modified setpoint temperature based on a desired setpoint temperature and a setpoint modification factor, and controlling HVAC equipment communicably coupled to the thermostat via a HVAC interface in accordance with the temperature readings from the temperature sensor and the modified setpoint temperature.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of the present invention are directed towards a smart thermostat for controlling the ambient air temperature of one area when the smart thermostat is located in a second area. For example, a single thermostat located in a hallway may control the ambient air temperature in a row of offices in an office building. The ambient air temperatures in the offices may vary considerably from the ambient air temperature in the hallway. Moreover, the ambient air temperature in the offices may change much more quickly than the ambient air temperature in the hallway. Both the relative and dynamic differences in ambient air temperatures results in poor temperature control in the offices. The smart thermostat described herein alleviates this problem by modifying one or more pre-programmed, desired temperatures using "setpoint modification factors", described later herein as information pertaining to the time of day, seasons, orientation of the area(s) controlled by the smart thermostat, location of an area controlled by a smart thermostat and weather conditions. By modifying desired setpoint temperatures, the ambient air temperature in the offices is better controlled by the smart thermostat located in the hallway to match a desired temperature in the offices.

Figure 1:
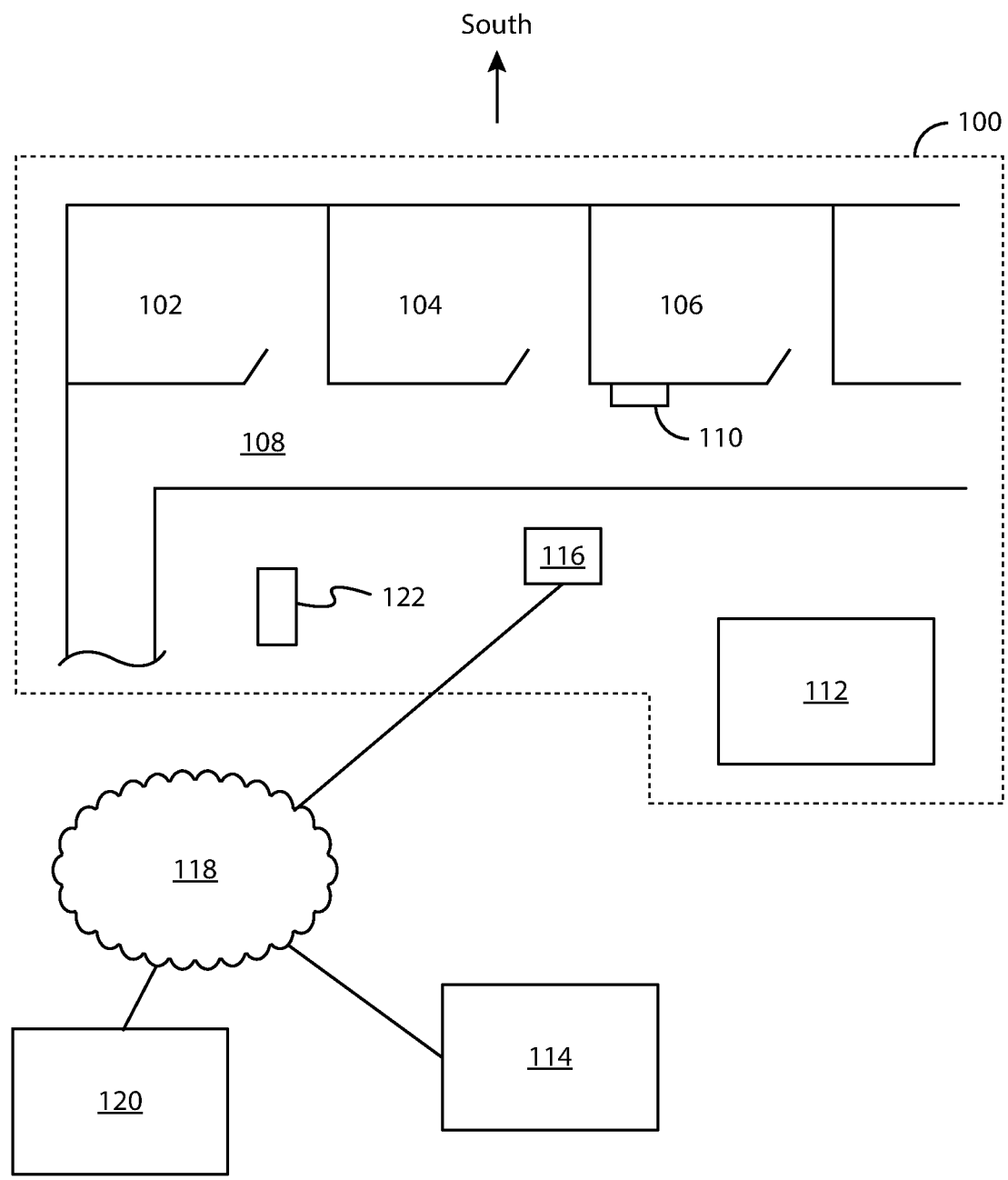
FIG. 1 is a top, plan view of a portion of a structure comprising several individual offices connected to one another by a hallway, where a smart thermostat in accordance with the teachings herein, is located.

FIG. 1 is a top, plan view of a portion of a structure 100, comprising office 102, office 104, office 106, and hallway 108. In this embodiment, structure 100 comprises an office building, but in other embodiments, the structure could comprise a residence or a factory, or some other structure having at least two areas serviced by HVAC equipment. For purposes of illustration, the inventive concepts described herein will be discussed in terms of smart thermostat 110 located in hallway 108, controlling the ambient air temperature in offices 102-106.

The ambient air temperature in each of the office shown in FIG. 1 is controlled by smart thermostat 110 located in hallway 108 that controls HVAC equipment 112. HVAC equipment 112 comprises well-known heating or cooling systems, such as central air furnaces, central air conditioners, or both, used to heat the offices and hallway 108 during cold weather and/or to cool the offices and hallway 108 during hot weather. Smart thermostat 110 comprises an internal temperature sensor that senses the ambient air temperature in hallway 108 where smart thermostat 110 is located, and controls HVAC equipment 112 to achieve desired ambient air temperatures in each of the offices.

Like prior art thermostats, smart thermostat 110 may be pre-programmed with one or more "setpoints" in the form of desired temperatures and days and times when the desired temperatures should be achieved. For example, during the summer, a user may program thermostat 110 with a setpoint temperature of 72 degrees to maintain a temperature of 72 degrees in each of the offices shown in FIG. 1, starting at 8 am, Monday-Friday, and "off" after 5 pm each weekday and on the weekends. As Sam nears each day Monday-Friday, thermostat 110 sends signals to HVAC equipment 112 to begin cooling if the current ambient air temperature measured by thermostat 110 is above 72 degrees.

The term "setpoint" may additionally be used herein to describe a desired temperature setting entered by a user manually, in order to change the ambient air temperature to the temperature entered by the user.

To achieve the setpoint temperatures at the times specified in the setpoints, thermostat 110 typically begins heating or cooling before the setpoint time for each setpoint. In this way, the desired office temperature is often achieved by the time the setpoint time is reached. This is known in the art as "thermal ramping" or simply, "ramping". Thermostat 110 may be pre-programmed to begin ramping a predetermined, fixed time period before each setpoint time, such as 15 minutes or 30 minutes. In some embodiments, thermostat 110 may alter the start time of such ramping, as described by U.S. patent application Ser. No. 15/859,573, assigned to the assignee of the present applicant and incorporated by reference herein.

Continuing the above example, the 72 degree desired setpoint temperature may be automatically modified by thermostat 110, depending on one or more setpoint modification factors, such as the time of day, the current season, the orientation of offices or rooms relative to the sun (i.e., relative to a compass heading), the location of structure 100, and current or future weather conditions, as more fully described later herein. For example, the 72 degree desired setpoint temperature might be changed to 68 degrees at 11 am, when the temperatures in the offices begins to rise quickly as the sun rises in the sky. In another embodiment, the desired setpoint temperature may be adjusted several times throughout the day or continuously. By adjusting the desired setpoint temperature lower, activation of HVAC equipment 112 occurs sooner than would ordinarily happen, to cool the offices when the ambient hallway temperature is only 68 degrees.

Figure 2:
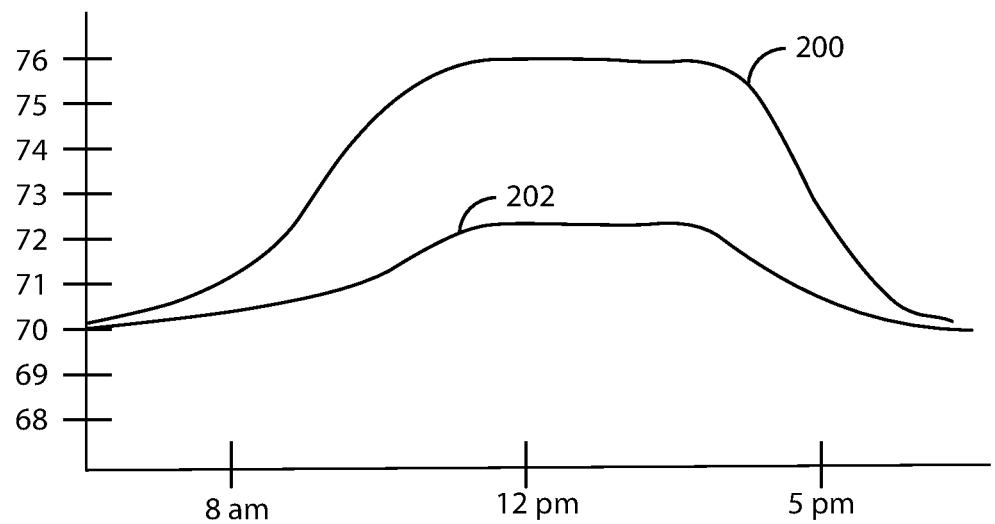
FIG. 2 is a graph showing one example of ambient temperatures over time in the offices and hallway of FIG. 1 over the course of a given day using a prior-art thermostat.

FIG. 2 is a graph showing one example of ambient temperatures over time in the offices and in hallway 108 over the course of a given day using a prior-art thermostat. This graph illustrates how the ambient temperature 200 in the offices rise much more quickly than the ambient temperature 202 in hallway 108 and stay elevated with respect to the ambient air in hallway 108, even after cooling is provided by HVAC equipment 112 when, in this example, the ambient air temperature in hallway 108 reaches 71 degrees (in this example, the desired setpoint temperature). As shown, by the time cooling begins at about 11 am, when the ambient air temperature in hallway 108 is 71 degrees, the temperature inside the offices has reached approximately 73 degrees and continues increasing until it plateaus at about 76 degrees. Meanwhile, the temperature in hallway 108 only reaches approximately 72 degrees, due to the fact that hallway 108 does not receive directly sunlight, unlike the offices.

Figure 3:
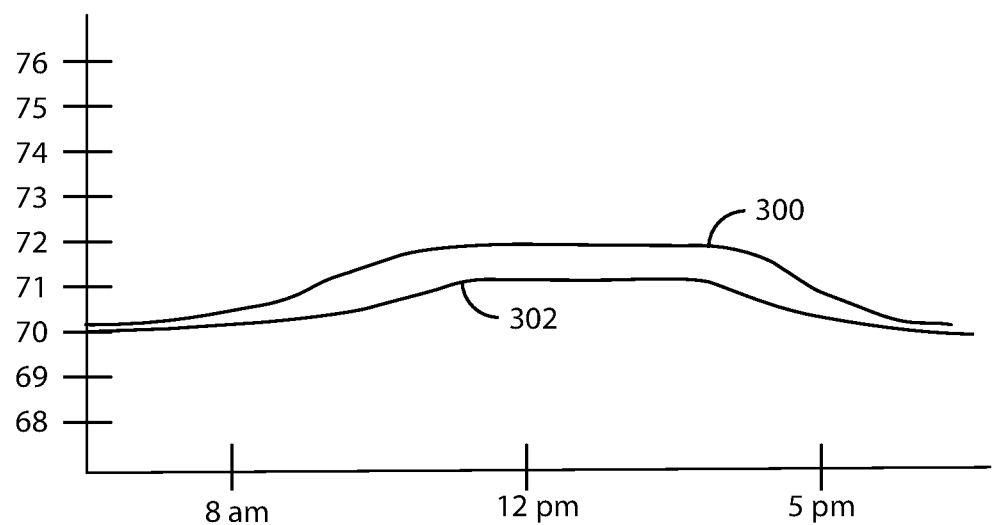
FIG. 3 is a graph showing how the ambient air temperatures in the offices and hallway of FIG. 1 respond when using the smart thermostat of FIG. 1.

FIG. 3 is a graph showing how the ambient air temperature 300 in the offices and the ambient air temperature 302 in hallway 108 respond when using smart thermostat 110. Here, smart thermostat 110 has lowered the desired setpoint temperature from 71 degrees to 68 degrees, to begin at or before 8 am, resulting in HVAC equipment 112 providing cooling at Sam (the desired setpoint temperature time in this example) in an attempt to keep the temperatures in the offices from rising too far about the desired temperature of 72 degrees. As shown, the temperature in the offices rises to about 72 degrees at about 9 am and hold at that temperature until the sun starts to wane in the western sky at about between 3 and 4 μm. The temperature in hallway 108 rises to about 71 degrees by 9 am, maintaining that temperature until falling off at about between 3 and 4 pm. As this graph shows, the temperature inside the offices meets the desired temperature of 72 degrees as pre-programmed into thermostat 110 and is also much better regulated than when using a prior-art thermostat.

In one embodiment, thermostat 110 is coupled to weather server 114 via a local area network (LAN) established by router/modem 116 and a wide-area network 118, such as the Internet. Thermostat 110 may be provided with current and future weather conditions in a geographic area where structure 100 is located. Such current and future weather conditions may comprise an outdoor temperature, humidity, precipitation information, wind speed, wind direction, cloud coverage, and other current and future weather conditions. Smart thermostat 110 may be programmed by a user with information pertaining to the thermostat's location, typically by entry of a city and state, or the location may be determined by weather server 114 based on an IP address of router/modem 116 or an IP address assigned to smart thermostat 110 by router/modem 116. In any case, weather server 114 provides current and future weather information to thermostat 110 upon request from thermostat 110, for example at predetermined time intervals, or on a "push" basis as updates become available from weather server 114. Smart thermostat may use such current or future weather conditions to alter one or more desired setpoint temperatures, as explained in further detail below.

Figure 4:
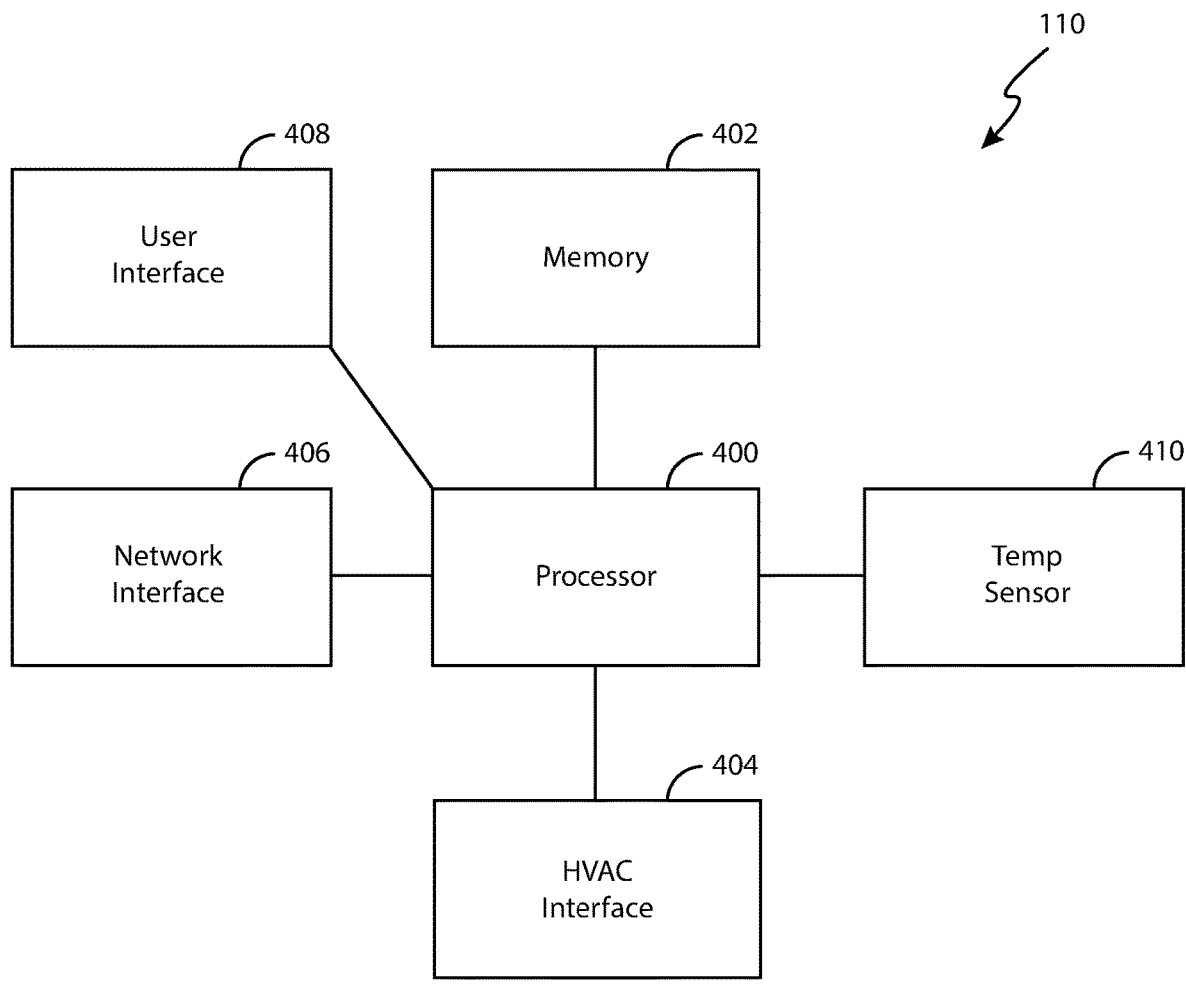
FIG. 4 is a functional block diagram of one embodiment of the smart thermostat as shown in FIG. 1.

FIG. 4 is a functional block diagram of one embodiment of smart thermostat 110, showing processor 400, memory 402, HVAC interface 404, network interface 406, user interface 408 and temperature sensor 410. It should be understood that certain functionality is not shown in FIG. 4, such as a power supply, for purposes of clarity. It should still further be understood that the functionality to modify pre-programmed setpoints may be performed externally to smart thermostat 110, such as in the case where such functionality is performed by a remote server 120 in communication with smart thermostat 110 via the local-area network established by router/modem 116 and wide-area network 118. In this case, smart thermostat 110 may provide setpoint information to remote server 120 (or it may be provided by a mobile device 122, such as a smart phone, tablet, or a computer) in a case where smart thermostat 110 may be programmed using an app running on mobile device 122), and remote server 120 may provide modified setpoints to smart thermostat 110 based on one or more setpoint modification factors.

Processor 400 comprises one or more general-purpose microprocessors, microcontrollers, custom ASICs and/or discrete components. Processor 400 may be selected based on processing capabilities, power-consumption, size, cost and/or other considerations. Processor 500 executes processor-executable instructions stored in memory 402 that causes thermostat 110 to perform a method for modifying setpoint information in accordance with the teaching herein.

Non-transitory memory 402 is coupled to processor 400 and comprises one or more information storage devices, such as RAM, ROM, flash memory, EEPROMs, UVPROMs, and/or any other type of electronic, optical, or mechanical information storage device, but excludes propagated signals. In some embodiments, memory 402 may be incorporated into processor 400, such as in the case of a microcontroller having onboard RAM and/or ROM capable of storing the processor-executable instructions and other information, such as setpoint information, current day, date and time information, location information of structure 100, modified setpoint information (determined by processor 400), one or more comfort settings (described later herein), setpoint modification factors, and other information.

HVAC interface 404 is coupled to processor 400, comprising well-known circuitry for allowing processor 500 to send command and control signals to HVAC equipment 112. In one embodiment, HVAC interface 404 comprises driver circuitry to communicate with HVAC equipment 112 via two or more wires. In other embodiments, HVAC interface 404 comprises wireless radio frequency circuitry, such as Zwave®, Zigbee® or Wi-Fi communication modules. In yet still other embodiments, HVAC interface 404 is not needed, and processor 400 communicates with HVAC equipment 112 via network interface 406.

Network interface 406 is coupled to processor 400, comprising circuitry necessary to send and receive information to and from electronic devices within a local-area network provided by router/modem 116, such as mobile device 122 (when mobile device 122 is within range of the local-area network) and other devices outside the local-area network, such as remote server 120, weather server 114 and mobile device 122 (when mobile device 122 is not within range of the local-area network). Such network interface circuitry is well known in the art and may comprise one or more BlueTooth, Wi-Fi, or RF circuitry, among others.

User interface 408 is coupled to processor 400, comprising circuitry and in some embodiments including an electronic display for providing information pertinent to the operation of smart thermostat 110 to people within viewing range of smart thermostat 110. Such information comprises a current ambient air temperature, a current setpoint temperature, an indication whether HVAC equipment 112 is actively heating or cooling, the current time, etc. User interface 408 may also allow user input to operate smart thermostat 110, (i.e., to program setpoints, to manually adjust temperature, etc.) to enter information that may be used by thermostat 110 (such as a location of structure 100), to enter setpoint modification factors, etc. User interface 408 may comprise one or more touch screen, pushbuttons, switches, levers, LEDs, or other well-known hardware and circuitry to provide information to users and, in some embodiments, allow user control of thermostat 110.

Temperature sensor 410 is coupled to processor 400, comprising a sensor that provides electronic signals to processor 400 in accordance with the ambient air temperature surrounding smart thermostat 110. Temperature sensor 410 may comprise one of a thermistor, a resistive temperature detector, a thermocouple, semiconductor-type apparatus, or some other temperature sensor known in the art.

Figure 5:
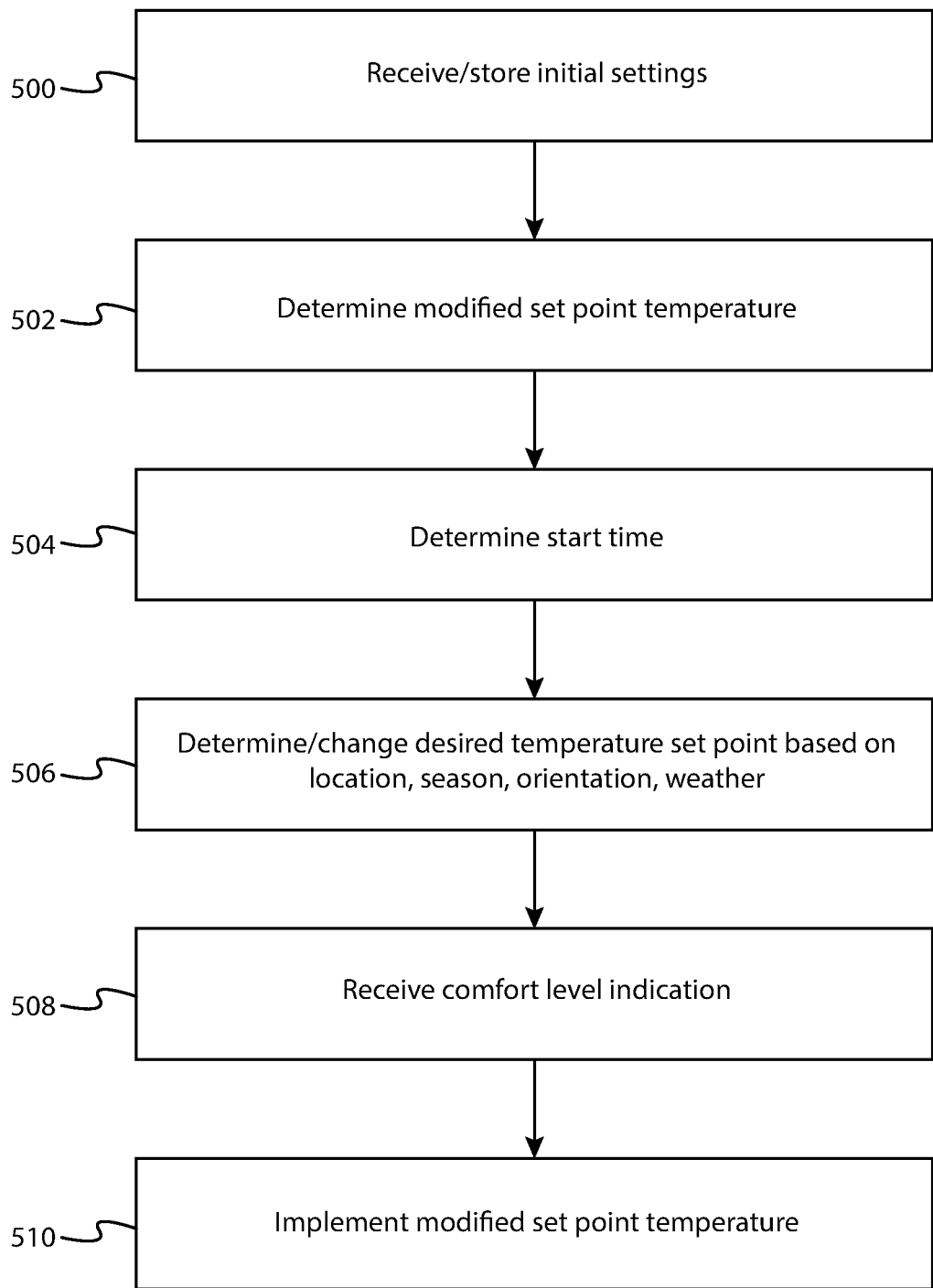
FIG. 5 is a flow diagram of one embodiment of a method, performed by the smart thermostat of FIGS. 1 and 4, for controlling the ambient air temperature of a first area while the smart thermostat is located in a second area.

FIG. 5 is a flow diagram of one embodiment of a method, performed by smart thermostat 110, for controlling the ambient air temperature of a first area while smart thermostat 110 is located in a second area. It should be understood that the steps described in this method could be performed in an order other than what is shown and discussed and that some minor method steps may have been omitted for clarity and simplicity. It should also be understood that the functionality described in this method may be performed by smart thermostat 110 or by a remote server in communication with smart thermostat 110 (or a prior art thermostat), such as remote server 120, via a local-area network provided by router/modem 116 and wide-area network 118 and that reference to thermostat 110 and its components can apply equally to such a remote server.

While the method, below, descries modification of a desired setpoint temperature in the context of HVAC equipment 112 cooling offices 102-106 during warm weather, the concepts could equally be applied in the context of HVAC equipment 112 heating the offices (or one or more rooms in a residence, one or more hotel rooms, one or more areas of a factory, warehouse or other commercial building, etc.) during cold weather. For example, in a cooling application, smart thermostat 110 may adjust a desired setpoint temperature from 72 degrees to 68 degrees. In cold weather, smart thermostat 110 may adjust a desired setpoint temperature of 70 degrees to 72 degrees, in order to obtain an actual, desired temperature of 70 degrees in the offices when smart thermostat 110 is located in a second, cooler area, such as hallway 108.

It should also be understood that modifying a desired setpoint temperature may be described herein as storing either a modifying setpoint temperature in memory 402 or storing a "temperature delta" representing a number of degrees to change a desired setpoint temperature. The terminology may be used interchangeably herein. In the former case, processor 400 stores the actual, modified setpoint temperature, for example, 69 degrees. In the latter case, processor 400 stores a temperature delta, i.e., −3 degrees, representing a number of degrees from the desired setpoint temperature that the modified setpoint temperature should be. Thus, in this case, processor 400 stores −3 degrees in memory 402 as the temperature delta, and when time to actually modify the desired setpoint temperature, processor 400 subtracts 3 degrees from the desired setpoint temperature, for example 72 degrees, in an attempt to cool, for example, offices 102-106 to a temperature of 69 degrees.

It should further be understood that the modified setpoint temperature could be determined by processor 400 once and stored in memory 402, once per day, multiple times per day, or even continuously throughout a day, and then executed at a different time.

At block 500, the method begins by programming smart thermostat 110 by a user, such as entering certain information, such as setpoint days, times and temperatures, a current day and time, a location of structure 100, an electronic address of a weather server, such as an IP address of weather server 114, orientation information (i.e., a compass direction where one or more areas whose ambient air temperature is controlled by smart thermostat 110 is facing, i.e., "north", "north-west", 270 degrees, etc.), a comfort level indication, a "temperature delta", a start time for a modified setpoint temperature to begin, and other information related to the operation of smart thermostat 110. For the remaining discussion, a single setpoint will be used as an example of how smart thermostat 110 modifies setpoint information in a cooling application during warm weather to control the ambient air temperature of a first area (i.e., office 102, 104 and/or 106) while smart thermostat 110 is located in a second area (i.e., hallway 108). In this example, the desired setpoint time is 8 am, the desired setpoint temperature is 72 degrees. Processor 400 receives the aforementioned information and stores it in memory 402.

At block 502, in one embodiment, processor 400 automatically determines a modified setpoint temperature based on the temperature delta. Processor 400 determines the modified setpoint temperature by lowering the desired setpoint temperature, for example 72 degrees, by a temperature delta of between 1 and up to 10 degrees as stored in memory 402, for example −3 degrees, resulting in a modified setpoint temperature of 69 degrees. The temperature delta may be fixed, for example during initial programming of smart thermostat 110 at a point of manufacture of smart thermostat 110, or it may be programmable by a user of smart thermostat 110. For example, a factory may program smart thermostat 110 with a temperature delta of −1 degree during cooling or +1 degree during heating, or a user may enter a temperature delta of +/−2 degrees via either user interface 408 or mobile device 122, and change it later if it turns out that the temperature delta is too little or too much. In either case, processor 400 receives the temperature delta and stores it in memory 402 for use in determining modified setpoint temperature(s). For example, in a heating application during cold weather, if a desired setpoint temperature is 68 degrees and the temperature delta is 2 degrees, processor 400 determines a modified setpoint temperature of 70 degrees by adding the temperature delta of 2 degrees to the desired setpoint temperature of 68 degrees. In the current example, processer adds 2 degrees to the desired setpoint temperature of 72 degrees to arrive at a modified setpoint temperature of 74 degrees.

At block 504, processor 400 may determine a start time for the modified setpoint temperature to begin. The start time may be different than the desired setpoint time of 8 am in this example. For example, smart thermostat 110 may be programmed for a desired setpoint temperature of 72 degrees to control the ambient air temperature in the offices 102-106, beginning at 8am (in some cases, the start time is a predetermined time before the desired setpoint time in order to achieve the desired setpoint temperature at the desired setpoint time, such as 30 minutes, or 7:30 in this example). Processor 400 may modify the desired setpoint temperature to 70 degrees to control the ambient air temperature in the offices 102-106 to begin, for example, at 11 am.

The start time for processor 400 to use the modified setpoint temperature may comprise a fixed time stored in memory 402 entered either by the factory that manufactured smart thermostat 110 and/or by a user of smart thermostat 110 using either user interface 408 of mobile device 122. For example, smart thermostat 110 may be manufactured with a default start time of 11 am for cooling structure 100 during warm weather, as 11 am is typically when the effects of the sun begin to affect temperatures inside buildings such as structure 100. In another embodiment, a user may determine that it begins to get hot in office 104 at 11:30 am, due to the sun rising in the sky and the orientation of office 104 towards the sun. The user may enter 11:30 as the start time for smart thermostat 110 to begin using the modified setpoint temperature, overriding, in one embodiment, a factory setting of 11:00 am. In another embodiment, processor 400 automatically determines the start time by determining a time of day. For example, in a cooling application during warm weather, processor 400 may determine that the temperature inside hallway 108 begins to ramp upwards beginning at 12 pm by reading previously-stored temperature readings from temperature sensor 410. In response, processor 400 may determine a start time of 12 pm or, in another embodiment, offset this time to account for the time lag between temperatures rising in the offices and hallway 108, such as offsetting the 12 pm time by one hour for a start time of 11 am.

In some embodiments, at block 506, either the desired setpoint temperature, the modified setpoint temperature, the temperature delta, the start time, or a combination of these, may be determined, or changed, automatically by processor 400 in accordance of one or more setpoint modification factors, such as the location of structure 100, the current day, month or season, an orientation to the sun of one or more areas, such as offices 102-106 or one or more rooms of a residence, and current and/or future weather. Processor 400 may change the start time once per year, once per season, monthly, weekly, daily or on some other automated schedule, and the start time could be changed by an hour per season, a minute per week, 30 seconds per day, or some other time period. For example, if a user programs smart thermostat 110 with a start time of 11 am (i.e., a modified setpoint start time), processor 400 may automatically change the start time to 11:15 am when processor 400 determines that it is late summer (i.e., by determining, for example, that it is September $20^{th}$) and, accordingly, that the temperatures in offices 102-106 may not be getting as hot as during the peak summer months. Similarly, processor 400 may automatically determine that it is early summer (i.e., by determining, for example, that it is June 21) and, in response, change the start time from 11 am to 10:45 am, as the temperatures in offices 102-106 may be starting to warm up quickly more towards an earlier portion of the morning.

In another example, processor 400 may automatically alter the modified or desired setpoint temperature, temperature delta and/or start time in accordance with a location of structure 100 (i.e., the same location on earth as smart thermostat 110). For example, if structure 100 is located in Miami, Florida, processor 400 may increase a factory-set or user-set temperature delta such as from −1 degree to −4 degrees, to account for the warmer temperatures of southern Miami. Similarly, processor 400 may automatically decrease a desired or modified setpoint temperature if structure 100 is located in Portland, Maine, to account for the lower overall temperatures of that geographic area. In another embodiment, the location information is used to alter the start time of the modified setpoint temperature and/or setpoint information by an amount to compensate for the differences in sunup/sundown times caused by locations in different latitudes. For example, if a setpoint comprises a start time of 8 am, processor 400 may adjust the setpoint start time to an earlier time during summer months in structures located in northern latitudes, due to the earlier sun rises and later sun sets experienced in, say, Seattle, Washington, and adjust the setpoint start time to a later time during summer months in structures located in southern latitudes, due to the later sun rises and earlier sun sets experienced in, say, San Diego, California Processor 400 may determine the location of structure 100 by reading location information stored in memory 402, previously entered by a user, or use some other well-known technique, such as using an IP address of router/modem 116.

In another example, processor 400 may automatically change the desired or modified setpoint temperature, temperature delta and/or start time based on current or future weather conditions in proximity to structure 100. In this embodiment, processor 400 receives current and/or future weather reports from weather server 114 via network interface 406 based on location information of structure 100 as stored in memory 402, such as current or future temperatures, precipitation amounts, wind speeds, cloud conditions, etc. Processor 400 may then use the current or future weather conditions to modify the desired or modified setpoint temperature, temperature delta and/or start time to better control the ambient air temperatures in offices 102-106.

For example, if it is August in San Diego, California at 6 am, and the desired setpoint temperature is 72 degrees, and processor 400 has been using a modified setpoint temperature of 68 degrees beginning at 11 am each day, processor 400 may receive a forecast from weather server 114 at 6 am that calls for clouds and rain in the afternoon, and/or forecasts cooler weather that afternoon. In response, processor 400 may change the modified setpoint temperature from 68 degrees to 70 degrees, because offices 102-106 are not likely to get as hot in the afternoon during cool, cloudy and rainy weather outside as they would ordinarily on a hot summer day. Similarly, processor 400 could change a desired or modified setpoint temperature, temperature delta and/or start time as soon as an updated current or future weather conditions are received.

Having described the various ways processor 400 may use the location of structure 100, the current day, month or season, an orientation to the sun, and current and/or future weather conditions to change a modified or desired setpoint temperature, temperature delta and/or setpoint time, it should be understood that processor 400 could use a combination of the aforementioned to control the ambient air temperature in offices 102-106. For example, processor 400 may use a current season and orientation information together to change a modified or desired setpoint temperature, temperature delta and/or setpoint time.

Figure 6:
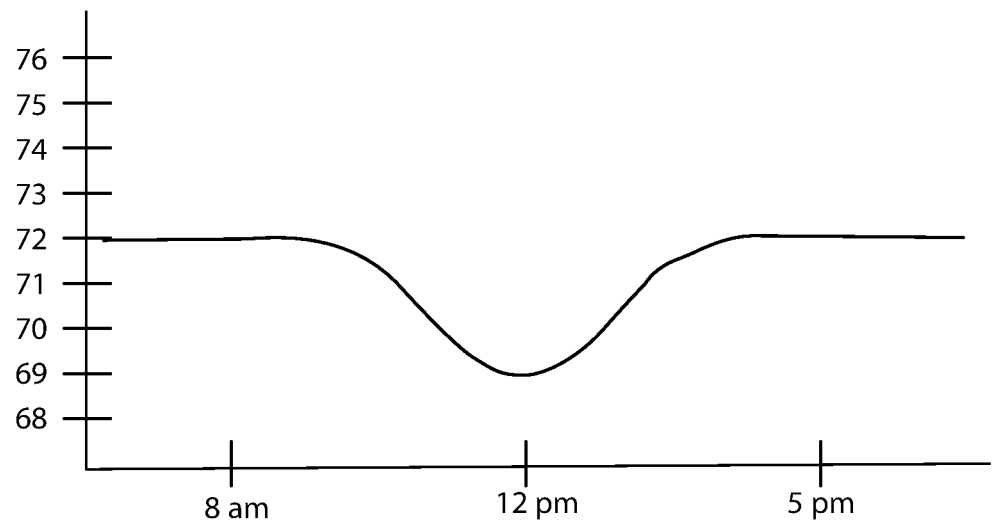
FIG. 6 is a graph showing one example of a modified setpoint temperature over time in an embodiment where the modified setpoint temperature is modified continuously.

In another embodiment, processor 400 may determine a continuous modification of the desired setpoint temperature to combat the effects of the sun as it rises, peaks and falls. For example, at 6 am, the sun may have a negligible effect on heating offices 102-106, while at 2 pm, perhaps the hottest time of the day, the ambient air temperature inside the offices may be dramatically increased. This effect may be even more profound as the orientation of the offices point towards the south (in the northern hemisphere; vice-versa for structures located in the southern hemisphere) as the offices are heated directly by the sun's rays. The continuous change may occur linearly or in accordance with a predetermined graphical representation, such as a half-sinusoid that matches the path that the sun makes across the sky, as shown in FIG. 6. FIG. 6 shows how processor 400 may modify the desired setpoint temperate continuously, in this case in the form of a half sinusoid) beginning at around 9:30 am, just as the sun begins to affect the ambient air temperature in offices 102-106, modifying the desired setpoint temperature from 72 degrees to about 69 degrees at about noon and then back to 72 degrees at around 5 pm. This waveform may resemble a path how the sun rises and falls throughout a day.

The temperature delta may be different during the first ½ of the day vs. the temperature delta during the $2^{nd}$ half of the day. For example, during 8 am to 2 pm, processor 400 may cause the temperature delta to change from 0 and decrease to −5, resulting in a slope of −0.833 degrees/hr, while the slope of the temperature delta between 2 μm and 5 pm may be steeper, i.e., a rate of +1.33 degrees/hr. In some embodiments, the slope of the temperature delta in a $2^{nd}$ half of the day may roll off at a smaller slope than the slope of the temperature delta during a first portion of a day. This may be desirable as the heat of the day is generally not symmetric around any particular time. For example, during 8 am to 2 pm, processor 400 may cause the temperature delta to begin at 0 and decrease to −5, resulting in a slope of −0.833, while between 2 μm and 5 pm, processor 400 may cause the temperature delta to change from −5 to −2, resulting in a slope of +1.0.

In another embodiment, processor 400 may change the modified setpoint temperature so that it returns to the desired setpoint temperature over a predetermined time period. This embodiment is useful in situations where the temperature difference between the offices and hallway 108 is relatively small (such as less than 2 or 3 degrees), when extreme outdoor temperatures are unlikely, and/or when the orientation of the offices avoids direct sunlight, such as orientations between southwest to southeast. In such cases, the temperature of the offices may approach the temperature of hallway 108 during the predetermined time period. For example, processor 400 may cause the modified setpoint temperature to return to the desired setpoint temperature linearly, in increments, or exponentially, over a predetermined time period, such as between 2-6 hours.

At block 508, processor 400 may receive a "comfort level indication" from a user of smart thermostat 110 to increase or decrease the modification setpoint temperature or the temperature delta. In another embodiment, the comfort level indication is pre-stored in memory 402 and processor 400 uses the comfort level indication when processor 400 receives an indication from a user via user interface 408 or via mobile device 122 and network interface 406 to implement the comfort level indication. The comfort level indication may comprise a numerical fraction, such as ⅒, ⅓, ⅔, or it may comprise a number, such as 1, 2 or 3, representing how much processor 400 should modify one or more desired setpoint temperatures. For example, a comfort level indication of 3 may indicate that the user wishes to cause a maximum change in the desired setpoint temperature, while a comfort level indication of 1 may indicate that the user wishes to cause only a slight change in the desired setpoint temperature. As an example, if a desired setpoint temperature is 72 degrees and processor 400 determines a modified setpoint temperature of 68 degrees, processor 400 may change the modified setpoint temperature of 68 degrees to 71 degrees after receiving an indication to implement a comfort level indication of 1, while processor 400 may change the modified setpoint temperature of 68 degrees to 67 degrees after receiving an indication to implement a comfort level indication of 3. Of course, the comfort level indication could comprise a fewer, or greater, number of representations, such as a number between 1 and 5.

At block 510, processor implements the modified setpoint temperature at a particular time, either at the setpoint time, i.e., in this example, 8 am, or at a different time, determined by processor 400 as described above. Implementing the modified setpoint temperature causes processor 400 to control HVAC equipment 112 by sending electronic signals to HVAC equipment 112 via HVAC interface 404 based on the modified setpoint temperature and the ambient air temperature of hallway 108 as reported by temperature sensor 410. For example, processor 400 may send an electronic signal to HVAC 112 that causes HVAC equipment 112 to turn on a central air conditioning unit to cool offices 102-106 until the ambient air temperature in hallway 108 reaches the modified setpoint temperature, at which time processor 400 may send an electronic signal to HVAC equipment 112 to turn the central air conditioning unit off.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, or other suitable non-transitory computer-readable memory. An exemplary storage medium is coupled to the processor such that the processor can read information from, and in some embodiments, write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A thermostat for controlling ambient air temperature of a second area of a building while located in a first area of the building, comprising:
   a temperature sensor;
   an HVAC interface;
   a memory for storing processor-executable instructions, a desired setpoint associated with the second area of the building and setpoint modification information; and
   a processor, coupled to the temperature sensor, the HVAC interface and the memory for executing the processor-executable instructions that causes the processor to:
   store, in the memory, temperature readings from the temperature sensor of ambient air in the first area of the building;
   modify the desired setpoint in accordance with the setpoint modification information to produce a modified setpoint; and
   control HVAC equipment communicably coupled to the thermostat via the HVAC interface in accordance with the temperature readings from the temperature sensor and the modified setpoint to attain a desired ambient air temperature at a desired time associated with the second area of the building.

2. The thermostat of claim 1, wherein the instructions for modifying the desired setpoint associated with the second area of the building comprises instructions that causes the processor to modify a desired setpoint temperature associated with the second area.

3. The thermostat of claim 2, wherein the modified setpoint temperature is determined based on a half sinusoidal waveform coinciding with a sun as the sun rises and falls throughout a day.

4. The thermostat of claim 1, wherein the instructions for modifying the desired setpoint associated with the second area of the building comprises instructions that causes the processor to modify a desired setpoint start time of a heating or cooling cycle in the second area.

5. The thermostat of claim 1, comprising further instructions that causes the processor to:
   after a heating or cooling cycle has begun, change the modified setpoint over time to return to the desired setpoint.

6. The thermostat of claim 5, wherein the desired setpoint comprises a desired setpoint temperature associated with the second area, and the modified setpoint comprises a modified setpoint temperature of the desired setpoint temperature over time, and the instructions for modifying the modified setpoint comprises instructions that causes the processor to:
   change the modified setpoint temperature associated with the second area over time to return to the desired setpoint temperature associated with the second area.

7. The thermostat of claim 1, wherein the instructions for modifying the desired setpoint associated with the second area of the building comprises instructions that causes the processor to:
   determine a time when the temperature readings begin to change; and
   modify a desired setpoint time of the desired setpoint to the time when the temperature readings begin to change.

8. The thermostat of claim 1, wherein the instructions for modifying the desired setpoint associated with the second area of the building comprises instructions that causes the processor to:
   determine a time when the temperature readings begin to change; and
   modify a desired setpoint time of the desired setpoint to a previous time before the time when the temperature readings begin to change.

9. The thermostat of claim 1, wherein the setpoint modification information comprises an orientation associated with the second area with respect to a compass heading, and the instructions for modifying the desired setpoint associated with the second area of the building comprises instructions that causes the processor to:
   modify the desired setpoint based on the orientation associated with the second area with respect to a compass heading.

10. The thermostat of claim 1, wherein the setpoint modification information comprises a date, and the processor-executable instructions that causes the processor to modify the desired setpoint associated with the second area comprises instructions that causes the processor to:
   determine a current date based on the date; and modify the desired setpoint based on the current date.

11. The thermostat of claim 1, further comprising:
a network interface coupled to the processor;
wherein the setpoint modification information comprises an identification of a weather server, and the processor-executable instructions that causes the processor to modify the desired setpoint associated with the second area comprises instructions that causes the processor to:
determine a current weather condition via the network interface and the weather server; and
modify the desired setpoint temperature associated with the second area in accordance with the current weather condition.

12. The thermostat of claim 1, wherein the setpoint modification information comprises a comfort level, and the processor-executable instructions comprises further instructions that causes the processor to:
modify the desired setpoint associated with the second area based on the comfort level indication.

13. The thermostat of claim 12, wherein the comfort level comprises an indication of how much the a modified setpoint temperature of the modified setpoint should vary from a desired setpoint temperature of the desired setpoint.

14. The thermostat of claim 1, further comprising:
a network interface coupled to the processor for receiving a weather forecast from a weather server, the weather forecast comprising a future outdoor temperature prediction;
wherein the setpoint modification information comprises an address of the weather server, and the processor-executable instructions that causes the processor to modify the desired setpoint associated with the second area comprises instructions that causes the processor to:
modify the desired setpoint associated with the second area in accordance with the future outdoor temperature prediction.

15. A method, performed by a thermostat located in a first area of a building, for controlling an ambient air temperature of a second area of the building, comprising:
storing temperature readings from a temperature sensor of ambient air in the first area of the building;
modifying a desired setpoint associated with the second area in accordance with setpoint modification information pre-programmed into the thermostat to produce a modified setpoint; and
sending a command to control HVAC equipment communicably coupled to the thermostat in accordance with the temperature readings from the temperature sensor and the modified setpoint to attain a desired ambient air temperature at a desired time associated with the second area of the building.

16. The method of claim 15, wherein modifying the desired setpoint associated with the second area of the building comprises modifying a desired setpoint temperature associated with the second area.

17. The method of claim 16, wherein the modified setpoint temperature is determined based on a half sinusoidal waveform coinciding with a sun as the sun rises and falls throughout a day.

18. The method of claim 15, wherein modifying the desired setpoint associated with the second area of the building comprises modifying a desired setpoint start time of a heating or cooling cycle in the second area.

19. The method of claim 15, comprising further instructions that causes the processor to:
after a heating or cooling cycle has begun, change the modified setpoint over time to return to the desired setpoint.

20. The method of claim 19, wherein the desired setpoint comprises a desired setpoint temperature associated with the second area, and the modified setpoint comprises a modified setpoint temperature of the desired setpoint temperature over time, and modifying the modified setpoint comprises:
change the modified setpoint temperature associated with the second area over time to return to the desired setpoint temperature associated with the second area.

21. The method of claim 15, wherein modifying the desired setpoint associated with the second area of the building comprises:
determining a time when the temperature readings begin to change; and
modifying a desired setpoint time of the desired setpoint to the time when the temperature readings begin to change.

22. The method of claim 15, wherein modifying the desired setpoint associated with the second area of the building comprises:
determining a time when the temperature readings begin to change; and
modifying a desired setpoint time of the desired setpoint to a previous time before the time when the temperature readings begin to change.

23. The method of claim 15, wherein the setpoint modification information comprises an orientation associated with the second area with respect to a compass heading, and modifying the desired setpoint associated with the second area of the building comprises:
modifying the desired setpoint based on the orientation associated with the second area with respect to a compass heading.

24. The method of claim 15, wherein the setpoint modification information comprises a date, and modifying the desired setpoint associated with the second area comprises:
determining a current date based on the date; and
modifying the desired setpoint based on the current date.

25. The method of claim 15, wherein the setpoint modification information comprises an identification of a weather server, and modifying the desired setpoint associated with the second area comprises:
determining a current weather condition from the weather server; and
modifying the desired setpoint temperature associated with the second area in accordance with the current weather condition.

26. The method of claim 15, wherein the setpoint modification information comprises a comfort level, the method further comprising:
modifying the desired setpoint associated with the second area based on the comfort level indication.

27. The method of claim 26, wherein the comfort level comprises an indication of how much the a modified setpoint temperature of the modified setpoint should vary from a desired setpoint temperature of the desired setpoint.

28. The method of claim 15, wherein the setpoint modification information comprises an address of the weather server, and modifying the desired setpoint associated with the second area comprises:
modifying the desired setpoint associated with the second area in accordance with the future outdoor temperature prediction.

* * * * *